United States Patent
Ekstrand et al.

(10) Patent No.: US 11,099,717 B2
(45) Date of Patent: Aug. 24, 2021

(54) VIDEO PLAYBACK METHOD AND APPARATUS

(71) Applicants: Huawei Technologies Co., Ltd., Shenzhen (CN); Simon Ekstrand, Eslov (SE)

(72) Inventors: Simon Ekstrand, Eslov (SE); Zongbo Wang, Lund (SE); Rui Li, Nanjing (CN); Guosheng Gu, Shenzhen (CN)

(73) Assignees: Huawei Technologies Co., Ltd., Shenzhen (CN); Simon Ekstrand, Eslov (SE)

(*) Notice: Subject to any disclaimer, the term of this patent is extended or adjusted under 35 U.S.C. 154(b) by 0 days.

(21) Appl. No.: 16/601,136

(22) Filed: Oct. 14, 2019

(65) Prior Publication Data
US 2020/0042144 A1    Feb. 6, 2020

Related U.S. Application Data

(63) Continuation of application No. 15/812,828, filed on Nov. 14, 2017, now Pat. No. 10,489,021, which is a (Continued)

(30) Foreign Application Priority Data

Nov. 27, 2015 (CN) .......................... 201510847800.1

(51) Int. Cl.
*G06F 3/0482* (2013.01)
*H04N 21/442* (2011.01)
(Continued)

(52) U.S. Cl.
CPC ........ *G06F 3/0482* (2013.01); *G06F 3/04847* (2013.01); *H04N 21/4312* (2013.01);
(Continued)

(58) Field of Classification Search
CPC .............. G06F 3/0482; G06F 3/04847; H04N 21/4312; H04N 21/44204;
(Continued)

(56) References Cited

U.S. PATENT DOCUMENTS

| 7,774,811 B2 | 8/2010 | Poslinski et al. |
| 8,793,575 B1 | 7/2014 | Lattyak et al. |

(Continued)

FOREIGN PATENT DOCUMENTS

| CN | 102497594 A | 6/2012 |
| CN | 102938853 A | 2/2013 |

(Continued)

OTHER PUBLICATIONS

Wilcox, "Amazon Fire TV Review—5 Minutes with Joe," https://joewilcox.com/2015/10/03/amazon-fire-tv-review/, XP055472412, pp. 1-11, (Oct. 3, 2015).

*Primary Examiner* — Jennifer N To
*Assistant Examiner* — Reji Kartholy
(74) *Attorney, Agent, or Firm* — Leydig, Voit & Mayer, Ltd.

(57) ABSTRACT

A video playback method includes: obtaining playback progress information of all sub-files in a video file, where the video file includes at least two sub-files; displaying a playback progress bar list, where the playback progress bar list includes playback progress bars of the at least two sub-files, and a playback progress bar of any sub-file displays playback progress of the any sub-file according to playback progress information of the any sub-file; receiving a user instruction used for selecting, according to the playback progress bars, a target sub-file that needs to be played, where the target sub-file is any sub-file of the at least two sub-files; and playing the target sub-file according to the instruction.

13 Claims, 6 Drawing Sheets

Related U.S. Application Data continuation of application No. PCT/CN2016/083195, filed on May 24, 2016.

(51) Int. Cl.

| | | |
|---|---|---|
| *H04N 21/431* | (2011.01) | |
| *H04N 21/845* | (2011.01) | |
| *G06F 3/0484* | (2013.01) | |
| *H04N 21/472* | (2011.01) | |
| *H04N 21/482* | (2011.01) | |
| *H04N 5/76* | (2006.01) | |

(52) U.S. Cl.
CPC . *H04N 21/44204* (2013.01); *H04N 21/47217* (2013.01); *H04N 21/4825* (2013.01); *H04N 21/8456* (2013.01); *H04N 5/76* (2013.01)

(58) Field of Classification Search
CPC ......... H04N 21/47217; H04N 21/4825; H04N 21/8456; H04N 5/76
See application file for complete search history.

(56) References Cited

U.S. PATENT DOCUMENTS

| | | | |
|---|---|---|---|
| 2005/0097135 A1 | 5/2005 | Epperson et al. | |
| 2006/0048184 A1* | 3/2006 | Poslinski | H04N 7/163 |
| | | | 725/45 |
| 2009/0158326 A1* | 6/2009 | Hunt | H04N 5/783 |
| | | | 725/38 |
| 2009/0186702 A1* | 7/2009 | Denk, Jr. | G06F 40/14 |
| | | | 463/42 |
| 2013/0227414 A1* | 8/2013 | Hwang | G06T 1/20 |
| | | | 715/719 |
| 2014/0359470 A1 | 12/2014 | Lin | |
| 2016/0110328 A1 | 4/2016 | Yang | |
| 2016/0275991 A1 | 9/2016 | Hwang et al. | |

FOREIGN PATENT DOCUMENTS

| | | |
|---|---|---|
| CN | 103294763 A | 9/2013 |
| CN | 104185039 A | 12/2014 |
| CN | 104317581 A | 1/2015 |
| CN | 104735517 A | 6/2015 |
| CN | 105430508 A | 3/2016 |
| KR | 20130097372 A | 9/2013 |

* cited by examiner

VIDEO PLAYBACK METHOD AND APPARATUS

CROSS-REFERENCE TO RELATED APPLICATIONS

This application is a continuation of U.S. patent application Ser. No. 15/812,828 filed on Nov. 14, 2017, which is a continuation of International Patent Application No. PCT/CN2016/083195, filed on May 24, 2016, which claims priority to Chinese Patent Application No. 201510847800.1, filed on Nov. 27, 2015. All of the aforementioned patent applications are hereby incorporated by reference in their entireties.

TECHNICAL FIELD

Embodiments of the present invention relate to video playback technologies, and in particular, to a video playback method and apparatus.

BACKGROUND

With popularization of broadband network technologies, watching a network video has become an important entertainment manner in people's daily life. For example, when a user watches a video by using a network device such as an intelligent personal television (IPTV), a personal computer, a mobile phone, or a tablet, if the user does not want to watch currently played video content, the user needs to select, by opening an episode-selecting interface of the video, a video that needs to be watched.

In the prior art, an episode-selecting interface of a video generally can only display an episode list of the video. According to the episode list on the episode-selecting interface, the user selects a video that needs to be watched. During playback, playback progress of a current video is displayed at the bottom of a playback interface by using a playback progress bar.

However, in a playback manner in the prior art, when wanting to watch another video, the user cannot determine a watching status of the another video, and may repeatedly open a watched video, which causes inconvenience in selecting an episode by the user.

SUMMARY

The present invention provides a video playback method and apparatus, so as to resolve a prior-art problem of inconvenience in selecting an episode by a user because a watching status of another video can hardly be determined in a process of watching a video.

According to a first aspect, an embodiment of the present invention provides a video playback method, including:

obtaining playback progress information of all sub-files in a video file, where the video file includes at least two sub-files;

displaying a playback progress bar list, where the playback progress bar list includes playback progress bars of the at least two sub-files, and a playback progress bar of any sub-file displays playback progress of the any sub-file according to playback progress information corresponding to the any sub-file;

receiving a user instruction used for selecting, according to the playback progress bars, a target sub-file that needs to be played, where the target sub-file is a sub-file of the at least two sub-files; and playing the target sub-file according to the instruction.

In the video playback method provided in the embodiment of the present invention, a playback progress bar list of a sub-file is displayed on a playback interface of a video file, and playback progress and status of the sub-file may be displayed intuitively. A user can accurately learn current watching statuses of all sub-files according to the playback progress bar list, so as to avoid repeatedly opening a file that does not need to be watched. This is convenient for the user to select an episode.

Optionally, before the displaying a playback progress bar list, the method further includes: determining a target playback progress bar list pattern from at least two preset playback progress bar list patterns according to a predetermined rule, and displaying the playback progress bar list according to the target playback progress bar list pattern, where the at least two playback progress bar list patterns have different appearance display forms.

Optionally, the predetermined rule includes:

displaying a playback progress bar of a currently played sub-file and a playback progress bar of a sub-file adjacent to the currently played sub-file.

Optionally, the predetermined rule includes: displaying a playback progress bar of a currently played sub-file and a playback progress bar of a next sub-file of the currently played sub-file.

Multiple alternative display forms of a playback progress bar list may be provided for a user by presetting a playback progress bar list pattern. When a video file is played, a needed playback progress bar list pattern may be selected according to a current playback requirement.

Optionally, in the playback progress bar list, a playback progress bar corresponding to a sub-file that has been played has a first length, and a length of a playback progress bar corresponding to a not-played or partially played sub-file is not equal to the first length.

Optionally, playback progress bars corresponding to not-played sub-files or playback progress bars corresponding to partially played sub-files have a same second length.

Optionally, the playback progress bars in the playback progress bar list have a same length. Specifically, playback progress of a corresponding sub-file is distinguished by means of a color of a playback progress bar.

Playback progress of the sub-files is identified by using playback progress bars of different lengths, so that display interface space may be effectively used, and a watched sub-file and a not-watched sub-file may be intuitively distinguished.

Optionally, the playback progress bar list further includes a poster image of a sub-file corresponding to each playback progress bar.

Playback statuses and progress of all the sub-files are displayed in a manner of combining the playback progress bars of all the sub-files and corresponding poster images, which is convenient for a user to learn corresponding plot content and playback progress of a sub-file corresponding to each playback progress bar.

Optionally, before the obtaining playback progress information of all sub-files in a video file, the method further includes:

determining whether the currently played sub-file is played to a file end stage; or receiving a file playback switching instruction, where the file playback switching instruction is used to instruct to switch a currently played file.

Obtaining the playback progress information of all the sub-files in the video file is triggered by determining whether the currently played sub-file is played to the file end stage or by receiving the file playback switching instruction, so that different manners of invoking the playback progress bar list may be provided for a user, which is convenient for the user to select a video that the user wants to watch in different cases.

Optionally, a playback progress bar of the currently played sub-file includes a progress sliding block, used to indicate a playback location of the currently played sub-file; and the receiving a user instruction used for selecting, according to the playback progress bars, a target sub-file that needs to be played includes:

receiving an instruction used for moving the progress sliding block; and moving, according to the instruction, the progress sliding block to a playback progress bar corresponding to the target sub-file.

According to a second aspect, the present invention provides a video playback apparatus, including:

an obtaining module, configured to obtain playback progress information of all sub-files in a video file;

a display module, configured to display a playback progress bar list, where the playback progress bar list includes playback progress bars of at least two sub-files, and a playback progress bar of any sub-file displays playback progress of the any sub-file according to playback progress information corresponding to the any sub-file and obtained by the obtaining module;

a receiving module, configured to receive a user instruction used for selecting, according to the playback progress bars, a target sub-file that needs to be played, where the target sub-file is a sub-file of the at least two sub-files; and a playing module, configured to play the target sub-file according to the instruction received by the receiving module.

The video playback apparatus is configured to execute the technical solution of the method embodiment in the first aspect, and a specific implementation principle and a beneficial effect of the video playback apparatus are similar to those of the method embodiment.

Optionally, the apparatus further includes a determining module, where the determining module is configured to determine a target playback progress bar list pattern from at least two preset playback progress bar list patterns according to a predetermined rule; and the display module is configured to display the playback progress bar list according to the target playback progress bar list pattern, where the at least two playback progress bar list patterns have different appearance display forms.

The receiving module is further configured to:

receive a file playback switching instruction, where the file playback switching instruction is used to instruct to switch a currently played file.

Optionally, the determining module is further configured to:

determine whether a currently played sub-file is played to a file end stage; and if the currently played sub-file is played to the file end stage, the obtaining module obtains the playback progress information of all the sub-files in the video file; or if the currently played sub-file is not played to the file end stage, the playing module continues playing the currently played sub-file.

Optionally, a playback progress bar of the currently played sub-file has a progress sliding block, used to indicate a playback location of the currently played sub-file;

the receiving module is further configured to receive an instruction used for moving the progress sliding block; and the apparatus further includes a moving module, where the moving module is configured to move, according to the instruction, the progress sliding block to a playback progress bar corresponding to the target sub-file.

According to a third aspect, an embodiment of the present invention further provides a video playback apparatus, including a data interface, a memory, a processor, and a communications bus, where the data interface, the memory, and processor are connected by using the communications bus;

the memory is configured to store a software program instruction;

the processor is configured to execute the software program instruction stored in the memory, so as to implement any one of the foregoing video playback methods; and the data interface is configured to obtain data or output data under the control of the processor.

In the video playback method and apparatus provided in the embodiments of the present invention, a playback progress bar list of a sub-file is displayed on a playback interface of a video file, and playback progress and status of the sub-file may be displayed intuitively. A user can accurately learn current watching statuses of all sub-files according to the playback progress bar list, so as to avoid repeatedly opening a file that does not need to be watched.

BRIEF DESCRIPTION OF DRAWINGS

To describe technical solutions in embodiments of the present invention more clearly, the following briefly describes the accompanying drawings. The accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes technical solutions in embodiments of the present invention with reference to the accompanying drawings. The described embodiments are merely some embodiments but not all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Embodiments of the present invention are used to display a playback progress bar list on a playback interface of a video file in a process of playing the video file, and display playback progress of a corresponding sub-file by using a playback progress bar in the playback progress bar list. According to the playback progress bar, a user may intuitively select a sub-file that needs to be played, so that the user can switch a to-be-played file according to a watching requirement.

Figure 1:
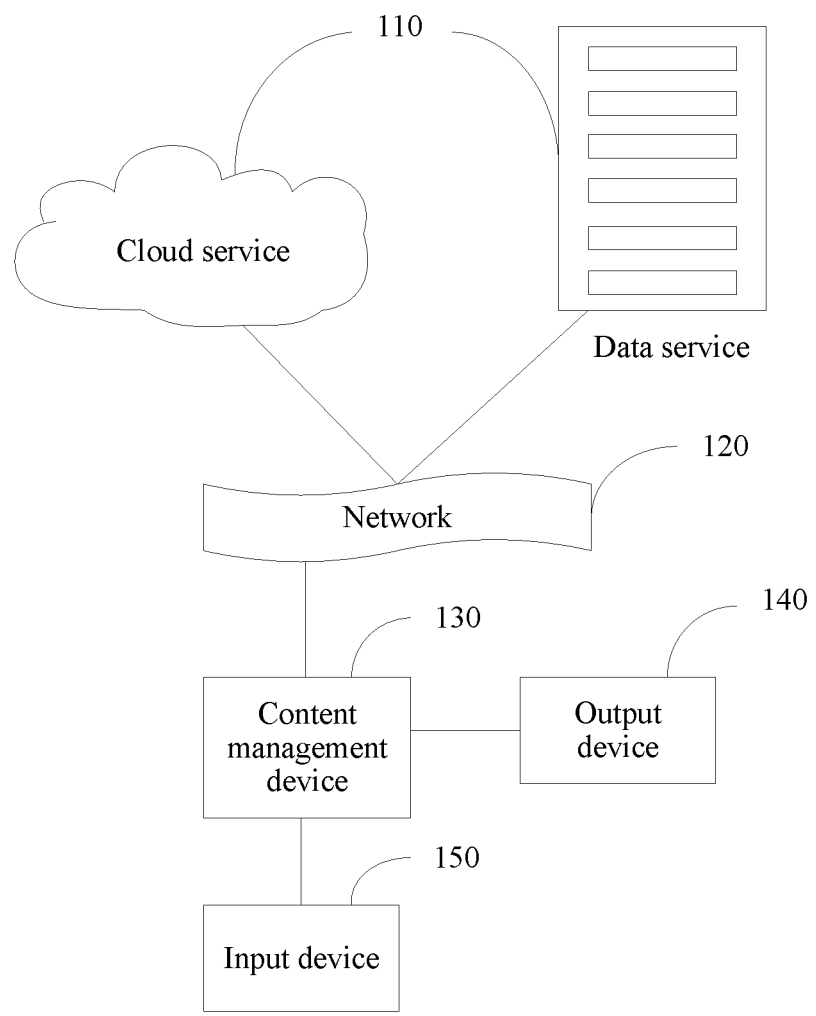
FIG. 1 is a schematic structural diagram of a framework of a video playback system according to an embodiment of the present invention.

FIG. 1 is a schematic structural diagram of a framework of a video playback system according to an embodiment of the present invention. Referring to FIG. 1, the video playback system in the embodiment of the present invention includes a server 110, a network 120, a content management device 130, an output device 140, and an input device 150.

The server 110 may be a cloud data storage server or a common data server. The server 110 is configured to store data such as a video file, playback progress information of a video file, and a playback progress bar template list.

The content management device 130 may be specifically a set top box, an Internet television, a smart tablet, a smartphone, an application in a smart tablet or a smartphone, or the like, and is configured to receive a control instruction sent by the input device 150 and data in a network, process the data, and send processed data to the output device 140.

The output device 140 may be specifically an image-forming device such as a display or a television and/or an audio playback device, or the like, and is configured to output the data processed by the content management device 130.

The input device 150 may be specifically a key controller, a touchscreen controller, a mouse, or another input control device, and is configured to input the control instruction to the content management device 130.

Specifically, the data stored in the server 110, such as a video file, playback progress information of a video file, and a playback progress bar template list, is transmitted to the content management device 130 by using the network 120. A user sends a control instruction to the content management device 130 by using the input device 150. The content management device 130 processes data according to the control instruction sent by the input device 150, and then sends processed data to the output device 140 for display.

In another case, the data such as a video file, playback progress information of a video file, and a playback progress bar template list may not be transmitted to the content management device 130 by using the network, but be directly stored in the content management device 130.

Figure 2:
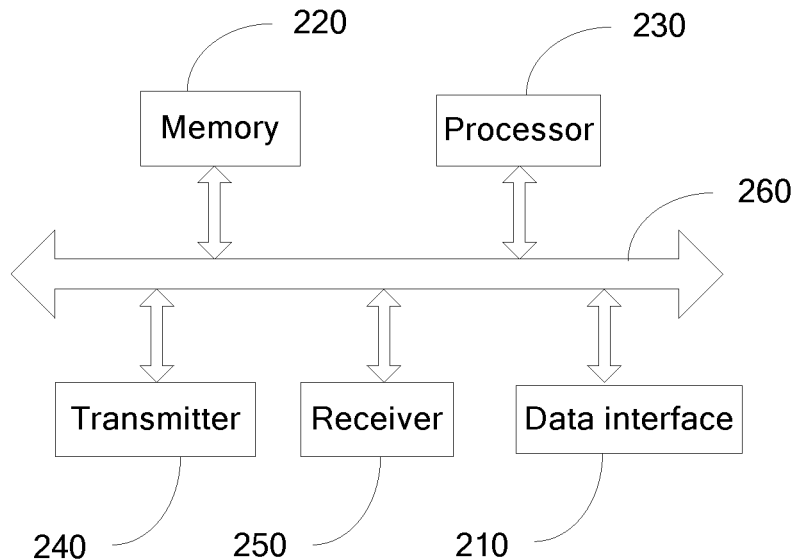
FIG. 2 is a schematic structural diagram of hardware of a video playback apparatus according to an embodiment of the present invention.

FIG. 2 is a schematic structural diagram of the content management device in FIG. 1. Referring to FIG. 2, the content management device 130 may specifically include a data interface 210, a memory 220, a processor 230, a transmitter 240, a receiver 250, and a communications bus 260. The data interface 210, the memory 220, the processor 230, the transmitter 240, and the receiver 250 implement data communication by using the communications bus 260.

The data interface 210 is configured to obtain data from the network 120, and transmit the data to the memory 220 and the processor 230. The data may be data such as a video file, playback progress information of a video file, and a playback progress bar template list, or may be other data needed according to a user requirement for video file playback.

The memory 220 is configured to store a program and/or a module for playing a video file and partial data obtained by the data interface 210, and is configured to provide the partial data for the processor 230 for processing.

The processor 230 is a control center of the content management device, is connected to various parts of the content management device by using various interfaces and lines, and executes various functions of the content management device and processes video file data by running or executing a software program and/or module stored in the memory 220 and invoking data stored in the memory 220. The processor 230 may include an integrated circuit (IC), for example, may include a single packaged IC, or may include multiple packaged ICs that are connected and have a same function or different functions. For example, the processor 230 may include only a central processing unit (CPU), or may be a combination of a graphics processing unit (GPU), a digital signal processor (DSP), and a control chip.

Specifically, the content management device 130 obtains the data such as a video file, playback progress information of a video file, and a playback progress bar template list from the network 120 by using the data interface 210, and transmits the data to the memory 220 and the processor 230. Specifically, the video file and the playback progress information of the video file are transmitted to the processor 230, and the playback progress bar template list is transmitted to the memory 220. The processor 230 processes video file data transmitted by the data interface 210 according to an instruction received by the receiver 250, and sends, by using the transmitter 240, processed video file data to the output device 140 for display.

In another case, the data such as a video file, playback progress information of a video file, and a playback progress bar template list may be directly stored in the memory 220; and according to an instruction received by the receiver 250, the processor 230 may directly process video file data stored in the memory 220.

Figure 3:
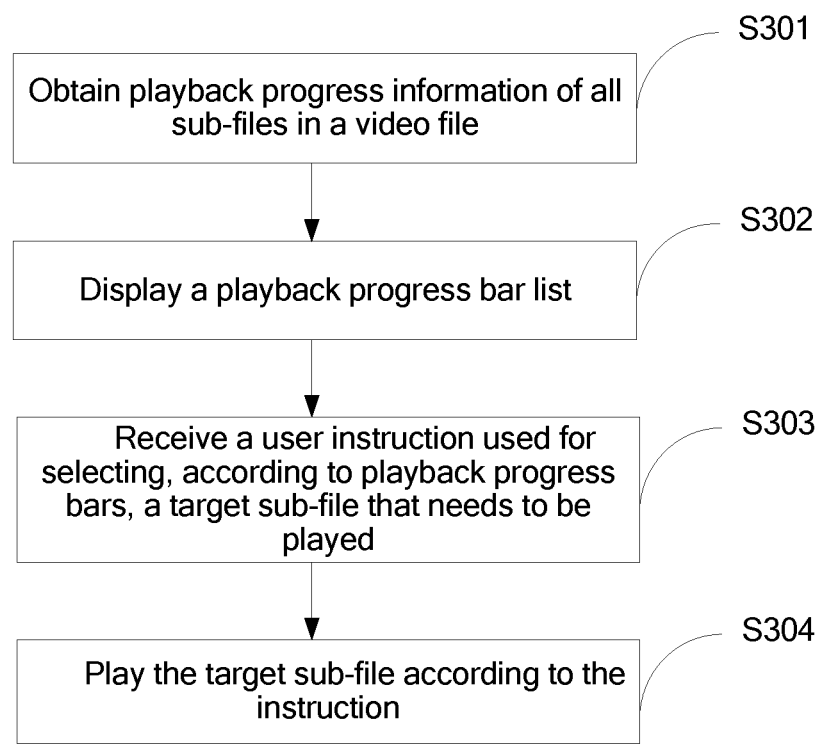
FIG. 3 is a schematic flowchart of a video playback method according to an embodiment of the present invention.
Figure 4:
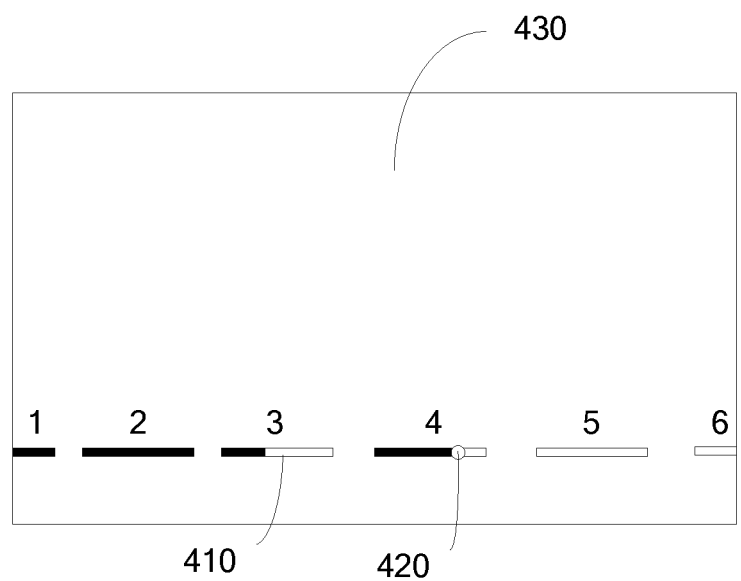
FIG. 4 to FIG. 9 are schematic diagrams of a playback progress bar list pattern according to an embodiment of the present invention.
Figure 5:
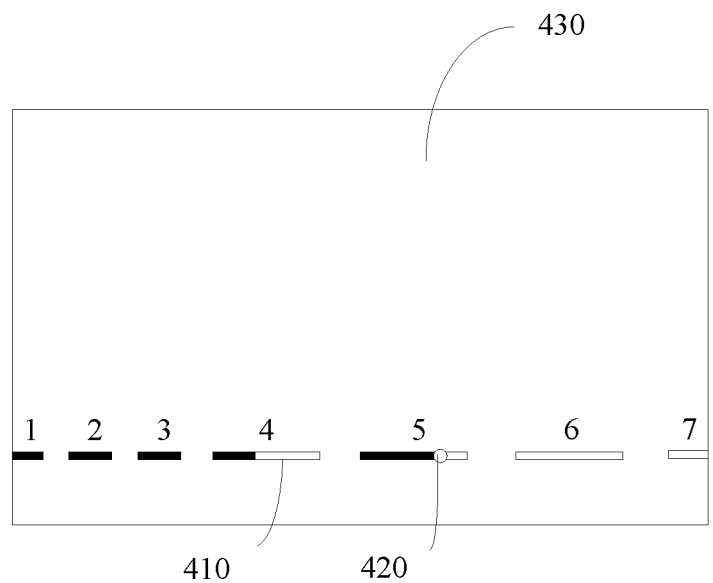
Figure 6:
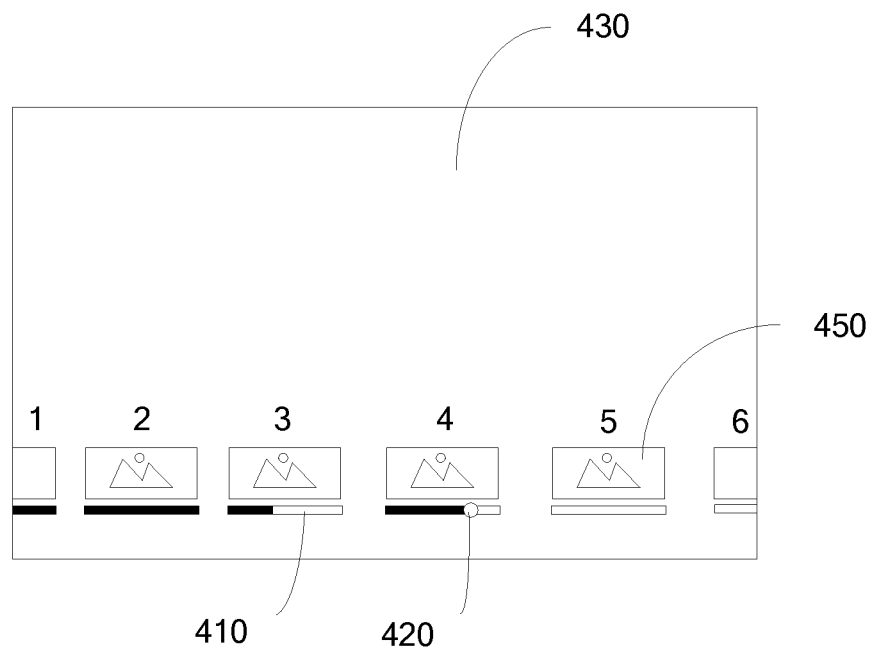
Figure 7:
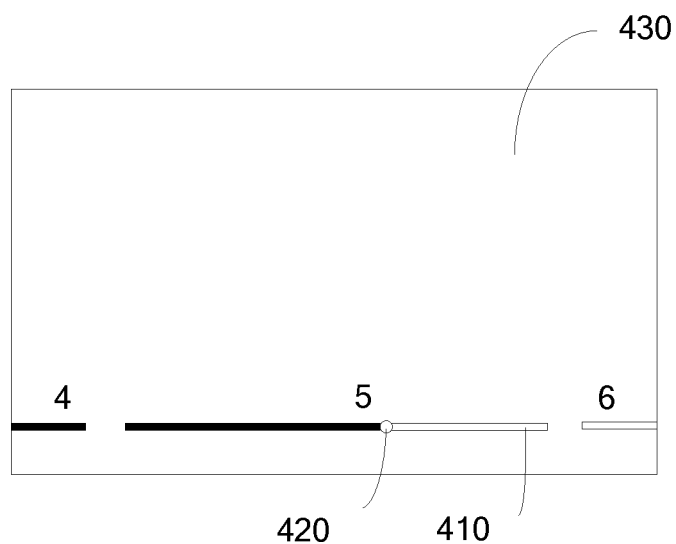

FIG. 3 is a schematic flowchart of a video playback method according to an embodiment of the present invention. The video playback method in the embodiment of the present invention may be implemented by using the content management device shown in FIG. 2 and a video playback system architecture shown in FIG. 1. Referring to FIG. 3, the video playback method in the embodiment of the present invention includes the following steps.

S301. A data interface obtains playback progress information of all sub-files in a video file, where the video file includes at least two sub-files.

In a process of playing all the sub-files, the playback progress information of all the sub-files may be uploaded to a cloud data storage server or a common data server for storage, and be updated in real time according to current playback progress of all the sub-files. The data interface (for example, the data interface 210 in FIG. 2) may obtain the playback progress information of all the sub-files from the data server by using a network.

Specifically, in a process of playing a sub-file in the video file, the following two specific implementation manners, but not limited to the following two specific implementation manners, may be used to trigger a step in which the data interface obtains the playback progress information of all the sub-files in the video file.

In one implementation manner, a processor detects playback content of a currently played sub-file to determine whether the currently played sub-file is played to a file end stage. If the currently played sub-file is played to the file end stage, the processor controls the data interface to obtain the playback progress information of all the sub-files in the video file from the network. If the currently played sub-file is not played to the file end stage, the currently played sub-file continues to be played.

In the other implementation manner, in a watching process, a user sends a file playback switching instruction by using an input device. The file playback switching instruction is used to instruct to switch a currently played file. A receiver receives the file playback switching instruction. Upon detecting the file playback switching instruction, the processor may trigger the data interface to obtain the playback progress information of all the sub-files in the video file from the network.

S302. An output device displays a playback progress bar list, where the playback progress bar list includes playback progress bars of the at least two sub-files, and a playback progress bar of any sub-file displays playback progress of the any sub-file according to playback progress information corresponding to the any sub-file.

After obtaining the playback progress information of all the sub-files in the video file, the data interface transmits the playback progress information to the processor. The processor presents the playback progress information as playback progress bar list information corresponding to all the sub-files, and transmits the playback progress bar list information to the output device. The output device displays the playback progress bar list according to the playback progress bar list information. The playback progress bar list is displayed on a video playback interface of the output device. The playback progress bars of the at least two sub-files may be a playback progress bar of a currently played sub-file and a playback progress bar of another sub-file, or may be playback progress bars of any two sub-files.

Specifically, multiple playback progress bar list patterns may be generated according to various display forms of the playback progress bars in the playback progress bar list, and the multiple playback progress bar list patterns are pre-stored in a server or directly stored in a memory. The multiple playback progress bar list patterns have different appearance display forms.

FIG. 4 to FIG. 9 are schematic diagrams of a playback progress bar list pattern according to an embodiment of the present invention. Referring to FIG. 4 to FIG. 9, for easy of intuitive indication of current watching statuses and progress of all the sub-files, a playback progress bar 410 in the playback progress bar list is displayed at the bottom of a file playback interface 430. A progress sliding block 420 is displayed on the playback progress bar 410 corresponding to a currently played sub-file. The playback progress bar 410 may be set to be in multiple display forms. For example, referring to FIG. 4, playback progress bars 410 in the playback progress bar list may have a same length, and the current watching statuses and progress of all the sub-files are distinguished by using different colors. Alternatively, referring to FIG. 5, the current watching statuses and progress of all the sub-files may be distinguished according to lengths of the playback progress bars 410, or the current watching statuses and progress of all the sub-files are distinguished with reference to lengths of the playback progress bars 410 and colors. For example, in the playback progress bar list, a playback progress bar 410 corresponding to a sub-file that has been played has a first length. A length of a playback progress bar 410 corresponding to a not-played or partially played sub-file is not equal to the first length; or playback progress bars 410 corresponding to not-played sub-files or playback progress bars 410 corresponding to partially played sub-files have a same second length. A progress bar corresponding to a played part of the sub-file is displayed in gray, and a progress bar corresponding to a not-played part is displayed in a color other than gray. It may be understood that a progress bar color herein is an example, and constitutes no limitation on the present invention. In such a manner of distinguishing the current watching statuses and progress of all the sub-files with reference to the lengths of the playback progress bars and the colors, display interface space of the output device may be effectively used, and a watched sub-file and a not-watched sub-file may be intuitively distinguished. Further, a length of a playback progress bar 410 corresponding to a not-played or partially played sub-file may be greater than a length of a playback progress bar corresponding to a sub-file that has been played, which is convenient for a user to more accurately view or adjust progress of the not-played or partially played sub-file. Alternatively, referring to FIG. 6, the playback progress bar list may further include a poster image 450 of a sub-file corresponding to each playback progress bar 410, and the poster image 450 may be located above or below each corresponding playback progress bar 410. Playback statuses and progress of all the sub-files are displayed in a manner of combining the playback progress bars of all the sub-files and corresponding poster images, which is convenient for the user to learn corresponding plot content and playback progress of a sub-file corresponding to each playback progress bar. Specifically, the playback progress bars combined with poster images may also be sorted in a form of a grid. Optionally, a quantity of playback progress bars in the playback progress bar list may also be set according to a user requirement.

The playback progress bar list pattern may be stored in the memory in advance. Before the playback progress bar list is displayed, the processor determines, from preset playback progress bar list patterns, a target playback progress bar list pattern that needs to be displayed currently, and displays the playback progress bar list according to the target playback progress bar list pattern.

Specifically, in an implementation manner, the user may invoke the multiple preset playback progress bar list patterns on a current playback interface of the video file by using the input device, and select, from the multiple preset playback progress bar list patterns, the target playback progress bar list pattern that needs to be displayed currently. The processor may determine, from the stored playback progress bar list pattern according to a user selection instruction received by the receiver, the target playback progress bar list pattern that needs to be displayed currently, and display the playback progress bar list according to the target playback progress bar list pattern.

In another implementation manner, the processor may determine, according to a predetermined rule, the target playback progress bar list pattern that needs to be displayed currently.

Figure 8:
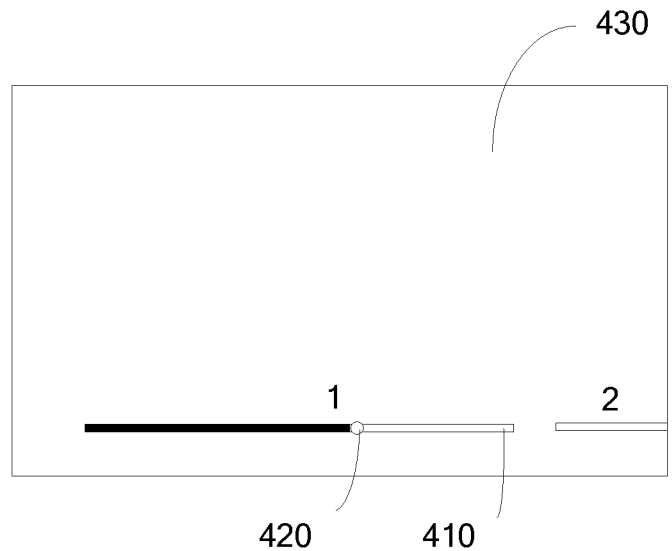
Figure 9:
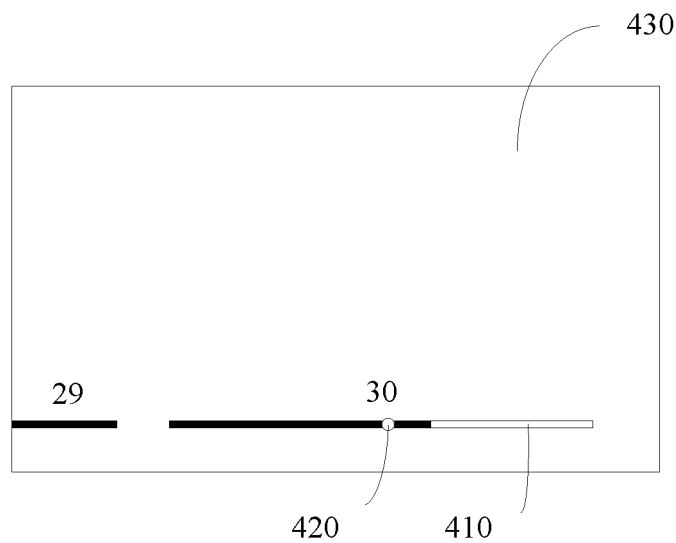

Specifically, the predetermined rule includes: displaying a playback progress bar of a currently played sub-file and a playback progress bar of a sub-file adjacent to the currently played sub-file. For example, referring to FIG. 7, a total quantity of the sub-files exceeds three episodes, and the sub-files are sorted according to an automatic playback sequence of a system. If the currently played sub-file is not the first episode or the last episode in the video file, a three-segmented playback progress bar list pattern may be determined as a playback progress bar list pattern that needs to be displayed currently. In the three-segmented playback progress bar list pattern, the playback progress bar of the currently played sub-file and playback progress bars of sub-files adjacent to the currently played sub-file may be displayed. Referring to FIG. 8 and FIG. 9, if the total quantity of the sub-files exceeds two episodes and the currently played sub-file is the first episode or the last episode in the video file, a two-segmented playback progress bar list pattern may be determined as the playback progress bar list pattern that needs to be displayed currently. When the sub-file is the first episode, in the two-segmented playback progress bar list pattern, a playback progress bar of the first episode and a playback progress bar of the second episode are displayed. When the sub-file is the last episode, in the two-segmented playback progress bar list pattern, a playback progress bar of the last episode and a playback progress bar of a sub-file adjacent to the last episode are displayed.

In another implementation manner, the predetermined rule may further include: displaying a playback progress bar of a currently played sub-file and a playback progress bar of a next sub-file of the currently played sub-file.

S303. A receiver receives a user instruction used for selecting, according to the playback progress bars, a target sub-file that needs to be played.

When a sub-file different from the currently played sub-file needs to be played, the user selects, according to display statuses of the playback progress bars, the target sub-file that needs to be played, and sends, to the receiver by using the input device, the instruction used for selecting the target sub-file that needs to be played. Specifically, the selection instruction may be sent by using a forward or backward function button of the input device, or the selection instruction may be sent by using the input device to directly enter an episode number corresponding to the target sub-file that needs to be played.

For example, in an implementation manner, the playback progress bar of the currently played sub-file may include a progress sliding block, used to indicate a playback location of the currently played sub-file. The user may send, by using the input device to move the progress sliding block, the instruction used for selecting the target sub-file that needs to be played. Specifically, the user sends, by using the input device (for example, pressing a forward or backward key of a remote controller), an instruction used for moving the progress sliding block. The receiver receives the instruction and transmits the instruction to the processor, and the processor moves the progress sliding block according to the instruction. The output device may play the sub-file when the progress sliding block is moved to a playback progress bar corresponding to the target sub-file selected by the user. Specifically, the processor may determine, according to a confirmation instruction sent by the input device, the target sub-file that needs to be played, or may directly determine, according to the instruction used for moving the progress sliding block sent by the input device, the target sub-file that needs to be played. When the progress sliding block is moved by using the input device, after the receiver receives the instruction used for moving the progress sliding block, the processor determines watching progress of the target sub-file, and controls the progress sliding block to move to an end location to which the target sub-file is played last time. If the target sub-file is never watched, the sliding block is controlled to move to a start location of the target sub-file. In this case, the user may be prompted whether to continue watching from an end location of last playback, and the user may perform confirmation by using the input device.

S304. The output device plays the target sub-file according to the instruction.

After receiving the user instruction used for selecting the target sub-file that needs to be played, the receiver transmits the instruction to the processor. The processor invokes data of the target sub-file according to the instruction, and transmits the data of the target sub-file to the output device by using a transmitter. The output device replaces the currently played sub-file with the target sub-file and plays the target sub-file. The playback progress bar list disappears.

In the video playback method provided in the embodiment of the present invention, a playback progress bar list of a sub-file is displayed on a playback interface of a video file, and playback progress and status of the sub-file may be displayed intuitively. A user can accurately learn current watching statuses of all sub-files according to the playback progress bar list, so as to avoid repeatedly opening a file that does not need to be watched.

Figure 10:
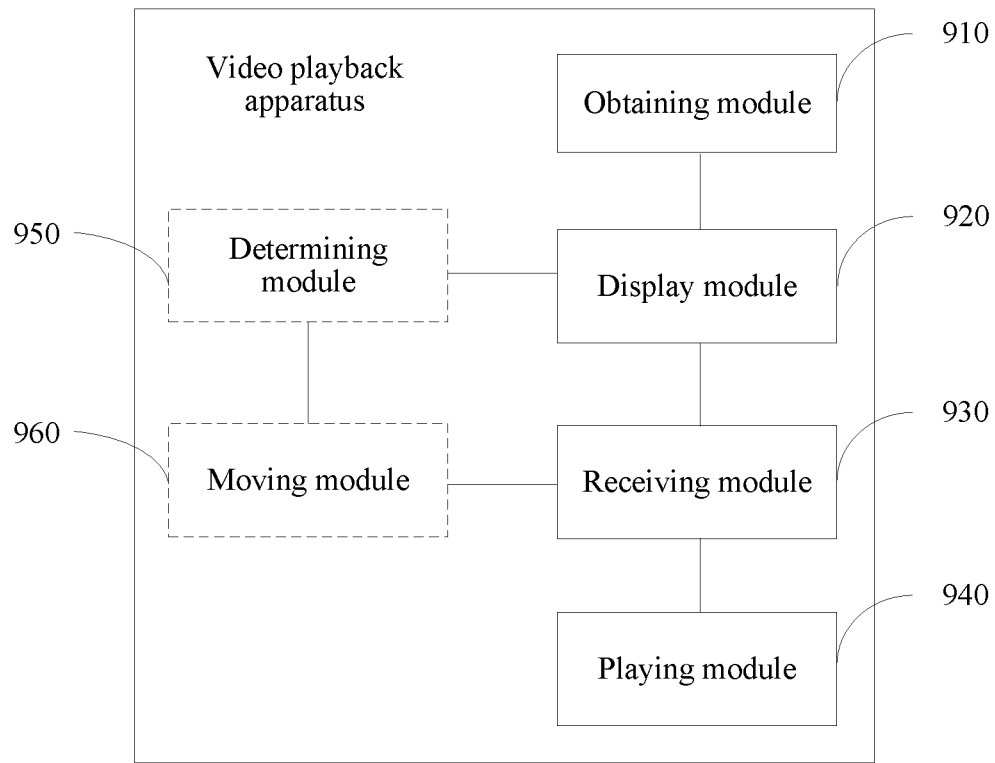
FIG. 10 is a schematic structural diagram of a video playback apparatus according to an embodiment of the present invention.

An embodiment of the present invention further provides a video playback apparatus. FIG. 10 is a schematic structural diagram of a video playback apparatus according to an embodiment of the present invention. Referring to FIG. 10, the video playback apparatus includes at least an obtaining module 910, a display module 920, a receiving module 930, and a playing module 940.

Specifically, the obtaining module 910 is configured to obtain playback progress information of all sub-files in a video file.

The display module 920 is configured to display a playback progress bar list, where the playback progress bar list includes playback progress bars of at least two sub-files, and a playback progress bar of any sub-file displays playback progress of the any sub-file according to playback progress information corresponding to the any sub-file and obtained by the obtaining module.

The receiving module 930 is configured to receive a user instruction used for selecting, according to the playback progress bars, a target sub-file that needs to be played.

The playing module 940 is configured to play the target sub-file according to the instruction received by the receiving module.

Optionally, the apparatus further includes a determining module 950, configured to determine a target playback progress bar list pattern from at least two preset playback progress bar list patterns according to a predetermined rule. The display module 920 is configured to display the playback progress bar list according to the target playback progress bar list pattern. The at least two playback progress bar list patterns have different appearance display forms.

Optionally, the determining module 950 is further configured to determine whether a currently played sub-file is played to a file end stage; and if the currently played sub-file is played to the file end stage, the obtaining module 910 obtains the playback progress information of all the sub-files in the video file; or if the currently played sub-file is not played to the file end stage, the playing module 940 continues playing the currently played sub-file.

Optionally, the receiving module 930 is further configured to receive a file playback switching instruction, where the file playback switching instruction is used to instruct to switch a currently played file.

Optionally, the obtaining module 910 is further configured to obtain a sequential location of the currently played sub-file in the video file; and the determining module 950 is further configured to determine, according to the sequential location, a file playback progress bar template that needs to be displayed currently.

Optionally, a playback progress bar of the currently played sub-file has a progress sliding block, used to indicate a playback location of the currently played sub-file;

the receiving module 930 is further configured to receive an instruction used for moving the progress sliding block; and the apparatus further includes a moving module 960, where the moving module 960 is configured to move, according to the instruction, the progress sliding block to a playback progress bar corresponding to the target sub-file.

It should be noted that the video playback apparatus provided in the embodiment of the present invention is presented in a combination form of function modules. The "module" may refer to an application-specific integrated circuit (ASIC), an electronic circuit, a processor that can execute one or more software programs and a memory, a combined logic circuit and/or another component that can provide the foregoing functions. As a specific example, a person skilled in the art may understand that the display module 920 may be implemented by the output device 140 in FIG. 1, such as a display. The playing module 940 may be implemented by the output device 140 in FIG. 1, such as a display and an audio playback device. The receiving module 930 may be implemented by the receiver 250 in FIG. 2. The obtaining module 910, the determining module 950, and the moving module 960 may be implemented by the processor 230 and the memory 220 in FIG. 2. Specifically, the processor 230 runs a software program and/or module stored in the memory 220, and invokes video playback data stored in the memory 220, so as to implement all functions of the obtaining module 910, the determining module 950, and the moving module 960, so that video file data is played.

Specifically, the video playback apparatus provided in the embodiment of the present invention is specifically configured to execute the technical solution provided in the foregoing method embodiment. Implementation principles and technical effects thereof are similar, and are not repeatedly described herein.

Figure 11:
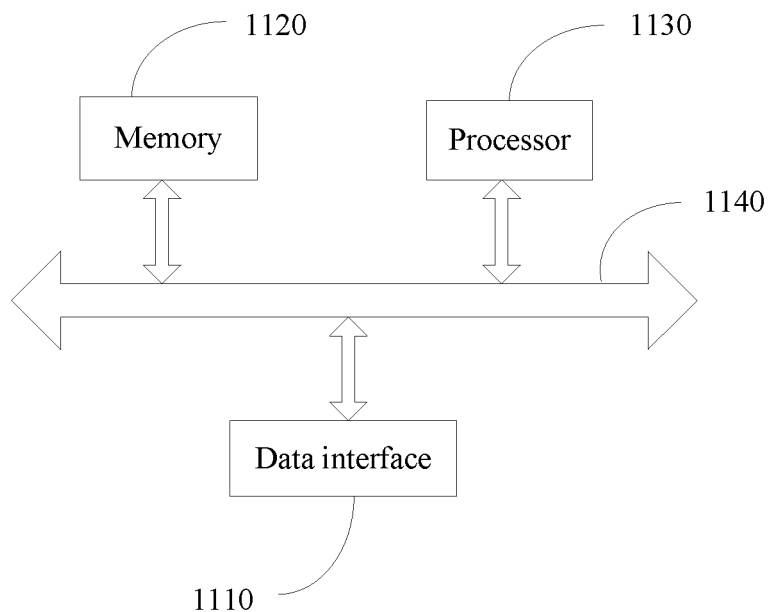
FIG. 11 is a schematic structural diagram of a video playback apparatus according to another embodiment of the present invention.

An embodiment of the present invention further provides another video playback apparatus. FIG. 11 is a schematic structural diagram of a video playback apparatus according to another embodiment of the present invention. Referring to FIG. 11, the video playback apparatus includes:

a data interface 1110, a memory 1120, a processor 1130, and a communications bus 1140. The data interface 1110, the memory 1120, and the processor 1130 are connected by using the communications bus.

The memory 1120 is configured to store a software program instruction.

The processor 1130 is configured to execute the software program instruction stored in the memory, so as to implement the video playback method provided in the method embodiment.

The data interface 1110 is configured to obtain data or output data under the control of the processor 1130.

The video playback apparatus provided in the embodiment of the present invention is specifically configured to execute the technical solution provided in the foregoing method embodiment. Implementation principles and technical effects thereof are similar, and are not repeatedly described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended for describing technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention. Additionally, statements made herein characterizing the invention refer to an embodiment of the invention and not necessarily all embodiments.

What is claimed is:

1. A video playback method, wherein the method comprises:

obtaining, by a video playback apparatus, playback progress information of all sub-files in a video file, wherein the video file comprises at least three sub-files;

determining, by the video playback apparatus, a target playback progress bar list pattern from at least two preset playback progress bar list patterns according to a predetermined rule, wherein the predetermined rule is based on whether a total quantity of sub-files is greater than or equal to three and whether a currently played sub-file is a first or last episode of the video file;

displaying, by the video playback apparatus, a playback progress bar list according to the determined target playback progress bar list pattern, wherein in case that the total quantity of sub-files is greater than or equal to three and the currently played sub-file is the first or last episode of the video file, the displayed playback progress bar list comprises playback progress bars of only two sequential sub-files, and in case that the total quantity of sub-files is greater than or equal to three and the currently played sub-file is not the first or last episode of the video file, the displayed playback progress bar list comprises playback progress bars of three sequential sub-files, and wherein a playback progress bar of a respective sub-file indicates playback progress of the respective sub-file according to playback progress information corresponding to the respective sub-file;

receiving, by the video playback apparatus, a user instruction for selecting a target sub-file to be played, wherein the target sub-file is a sub-file of the at least three sub-files; and playing, by the video playback apparatus, the target sub-file according to the user instruction.

2. The method according to claim 1, wherein in the playback progress bar list, a playback progress bar corresponding to a sub-file that has been played has a first length, and a length of a playback progress bar corresponding to a not-played or partially played sub-file is not equal to the first length.

3. The method according to claim 2, wherein playback progress bars corresponding to not-played sub-files or playback progress bars corresponding to partially played sub-files have a same second length.

4. The method according to claim 1, wherein the playback progress bars corresponding to all sub-files in the playback progress bar list have a same length.

5. The method according to claim 1, wherein the playback progress bar list further comprises, for each playback progress bar of the playback progress bar list, a respective poster image of a corresponding sub-file.

6. The method according to claim 1, wherein before obtaining the playback progress information of all sub-files in the video file, the method further comprises:
receiving a file playback switching instruction to play a sub-file different from the currently played sub-file.

7. The method according to claim 1, wherein before obtaining the playback progress information of all sub-files in the video file, the method further comprises:
determining whether a currently played sub-file is played to a file end stage; and
wherein obtaining the playback progress information of all sub-files in the video file is in response to determining that the currently played sub-file is played to the file end stage.

8. The method according to claim 1, wherein the playback progress bar of a currently played sub-file comprises a progress sliding block for indicating a playback location of the currently played sub-file; and
wherein receiving the user instruction for selecting the target sub-file to be played comprises:
receiving an instruction for moving the progress sliding block; and
moving, according to the instruction, the progress sliding block to a playback progress bar corresponding to the target sub-file.

9. A video playback apparatus, comprising a processor and a non-transitory computer-readable medium having processor-executable instructions stored thereon, wherein the processor-executable instructions, when executed by the processor, facilitate:
obtaining playback progress information of all sub-files in a video file, wherein the video file comprises at least three sub-files;
determining a target playback progress bar list pattern from at least two preset playback progress bar list patterns according to a predetermined rule, wherein the predetermined rule is based on whether a total quantity of sub-files is greater than or equal to three and whether a currently played sub-file is a first or last episode of the video file;
displaying a playback progress bar list according to the determined target playback progress bar list pattern, wherein in case that the total quantity of sub-files is greater than or equal to three and the currently played sub-file is the first or last episode of the video file, the displayed playback progress bar list comprises playback progress bars of only two sequential sub-files, and in case that the total quantity of sub-files is greater than or equal to three and the currently played sub-file is not the first or last episode of the video file, the displayed playback progress bar list comprises playback progress bars of three sequential sub-files, and wherein a playback progress bar of a respective sub-file indicates playback progress of the respective sub-file according to playback progress information corresponding to the respective sub-file;
receiving a user instruction for selecting a target sub-file to be played, wherein the target sub-file is a sub-file of the at least three sub-files; and
playing the target sub-file according to the user instruction.

10. The apparatus according to claim 9, wherein the processor-executable instructions, when executed, further facilitate:
receive a file playback switching instruction to instruct to switch a currently played file.

11. The apparatus according to claim 9, wherein the processor-executable instructions, when executed, further facilitate:
determining whether a currently played sub-file is played to a file end stage;
wherein obtaining the playback progress information of all sub-files in the video file is in response to determining that the currently played sub-file is played to the file end stage.

12. The apparatus according to claim 9, wherein a playback progress bar of a currently played sub-file has a progress sliding block for indicating a playback location of the currently played sub-file;
wherein receiving the user instruction for selecting the target sub-file to be played comprises:
receiving an instruction for moving the progress sliding block; and
moving, according to the instruction, the progress sliding block to a playback progress bar corresponding to the target sub-file.

13. A non-transitory computer-readable medium having processor-executable instructions stored thereon, wherein the processor-executable instructions, when executed, facilitate:
obtaining playback progress information of all sub-files in a video file, wherein the video file comprises at least three sub-files;
determining a target playback progress bar list pattern from at least two preset playback progress bar list patterns according to a predetermined rule, wherein the predetermined rule is based on whether a total quantity of sub-files is greater than or equal to three and whether a currently played sub-file is a first or last episode of the video file;
displaying a playback progress bar list according to the determined target playback progress bar list pattern, wherein in case that the total quantity of sub-files is greater than or equal to three and the currently played sub-file is the first or last episode of the video file, the displayed playback progress bar list comprises playback progress bars of only two sequential sub-files, and in case that the total quantity of sub-files is greater than or equal to three and the currently played sub-file is not the first or last episode of the video file, the displayed playback progress bar list comprises playback progress bars of three sequential sub-files, and wherein a playback progress bar of a respective sub-file indicates playback progress of the respective sub-file according to playback progress information corresponding to the respective sub file;
receiving a user instruction for selecting a target sub-file to be played, wherein the target sub-file is a sub-file of the at least three sub-files; and
playing the target sub-file according to the user instruction.

* * * * *